United States Patent [19]

Ackley, Sr. et al.

[11] 4,254,704

[45] Mar. 10, 1981

[54] CONVEYOR BAR WITH POCKET INSERT FOR CAPSULE PRINTING MECHANISMS

[75] Inventors: Charles E. Ackley, Sr., Oreland; Charles E. Ackley, Jr., Philadelphia, both of Pa.

[73] Assignee: R. W. Hartnett Company, Philadelphia, Pa.

[21] Appl. No.: 935,772

[22] Filed: Aug. 22, 1978

[51] Int. Cl.³ .................... B41F 17/36; B65G 47/14; B65G 47/24

[52] U.S. Cl. .................... 101/37; 101/40

[58] Field of Search .................... 101/36-40

[56] References Cited

U.S. PATENT DOCUMENTS

| | | | |
|---|---|---|---|
| 3,108,712 | 10/1963 | Hall | 221/172 |
| 3,272,118 | 9/1966 | Ackley | 101/37 |
| 3,871,295 | 3/1975 | Ackley | 101/40 |
| 3,931,884 | 1/1976 | Ackley | 101/40 |
| 4,104,966 | 8/1978 | Ackley et al. | 101/40 |

*Primary Examiner*—Clyde I. Coughenour
*Attorney, Agent, or Firm*—Miller & Prestia

[57] ABSTRACT

An improved capsule receiving conveyor bar to be carried by a transport conveyor of a capsule transport and printing device is disclosed. The conveyor bar includes a bar member and an insert attached thereto. The insert comprises a plurality of capsule receiving pockets formed therein. When the capsules are to be transported and subjected to a spin printing operation, each of the pockets comprise at least one recessed pocket portion so that indicia imprinted on the capsules in loci corresponding to the recessed portions will not smear as the capsules are rotated about their longitudinal axes during the spin printing operation.

6 Claims, 3 Drawing Figures

CONVEYOR BAR WITH POCKET INSERT FOR CAPSULE PRINTING MECHANISMS

BACKGROUND OF THE INVENTION

1. Field of the Invention

The present disclosure relates to a capsule receiving conveyor bar which is carried by the transport conveyor in a capsule transport and printing device. The bar receives capsules therein and carries them to working station such as a "wrap around" or "spin" printing station wherein the capsules are spun about their longitudinal axes as they are imprinted.

2. Prior Art

Many devices are known in which a multiplicity of randomly arranged capsules are first loaded onto a transport conveyor, transported to a rectification means wherein the capsules are all aligned in predetermined dispositions, and then further transported to a "wrap around" or "spin" printing station. One such device is disclosed in U.S. Pat. No. 3,871,295 (Ackley-of common assignment herewith). In the device disclosed in the —295 patent, a plurality of individual carriers 33 are provided to transport the capsules to the printing station after transfer from the main transport cylinder.

In FIG. 3 of U.S. Pat. No. 3,868,900 (Ackley—of common assignment herewith), there is taught the provision of a plurality of separate capsule receiving devices for use when adjacent rows of capsules are carried.

In U.S. Pat. No. 2,859,689 (Ackley—of common assignment herewith), the pellets are not rectified, but are transported to the printing station by transverse bars 110 which span and are connected to a pair of conveyor chains. Each bar is provided with a plurality of spring loaded pellet carrying cups which yield under the weight of the printing rolls so that the pellets therein disposed will not be crushed during the printing operation.

A plurality of separate capsule carrying pedestals 40 positioned on a conveyor bar are disclosed in conjunction with the conveying apparatus of U.S. Pat. No. 2,785,786 (Bartlett).

Despite these prior art devices, problems still exist with respect to capsule transportation in conjunction with the class of machines disclosed by the prior art patents. For instance, these machines usually create a great deal of static electricity which often times attracts dust and other particulate matter to the mechanism, resulting in the jamming of certain parts and reduced overall machine efficiency.

In the prior art mechanisms in which separate pedestals and the like are provided to carry the capsules, dust often collects between the separate capsule carriers, and is difficult to remove therefrom.

Also, the configuration of the capsule carrying pockets of each of the pedestals or carriers must be varied in accordance with the dimensions of the capsules to be carried therein. The prior art provision of individual carriers increases the difficulty of machine changeover to a different capsule type since each carrier must be individually removed from the machine and replaced by another formed in accordance with the configuration of the new capsules to be processed.

Further, in many prior art capsule carriers, the capsules can become smeared when imprinted in "wrap around" or "spin" fashion since the capsules are rotated about their longitudinal axes during the printing operation and since the printed indicia on a capsule may rub against a surface of the pocket.

Accordingly, it is an object of the present invention to provide a capsule carrying conveyor bar which reduces the problem of dust accumulation between capsule carriers.

It is a further object to provide a capsule carrying conveyor bar which minimizes machine changeover time when different capsule sizes are to be processed.

It is a further object to provide a capsule carrier which will minimize smearing of the indicia imprinted thereon during the "spin" printing process.

These and other objects are met by the improved conveyor bar with pocket insert for capsule printing mechanisms herein disclosed which will be further described in the following detailed description and appended drawings.

DRAWINGS

Figure 1:
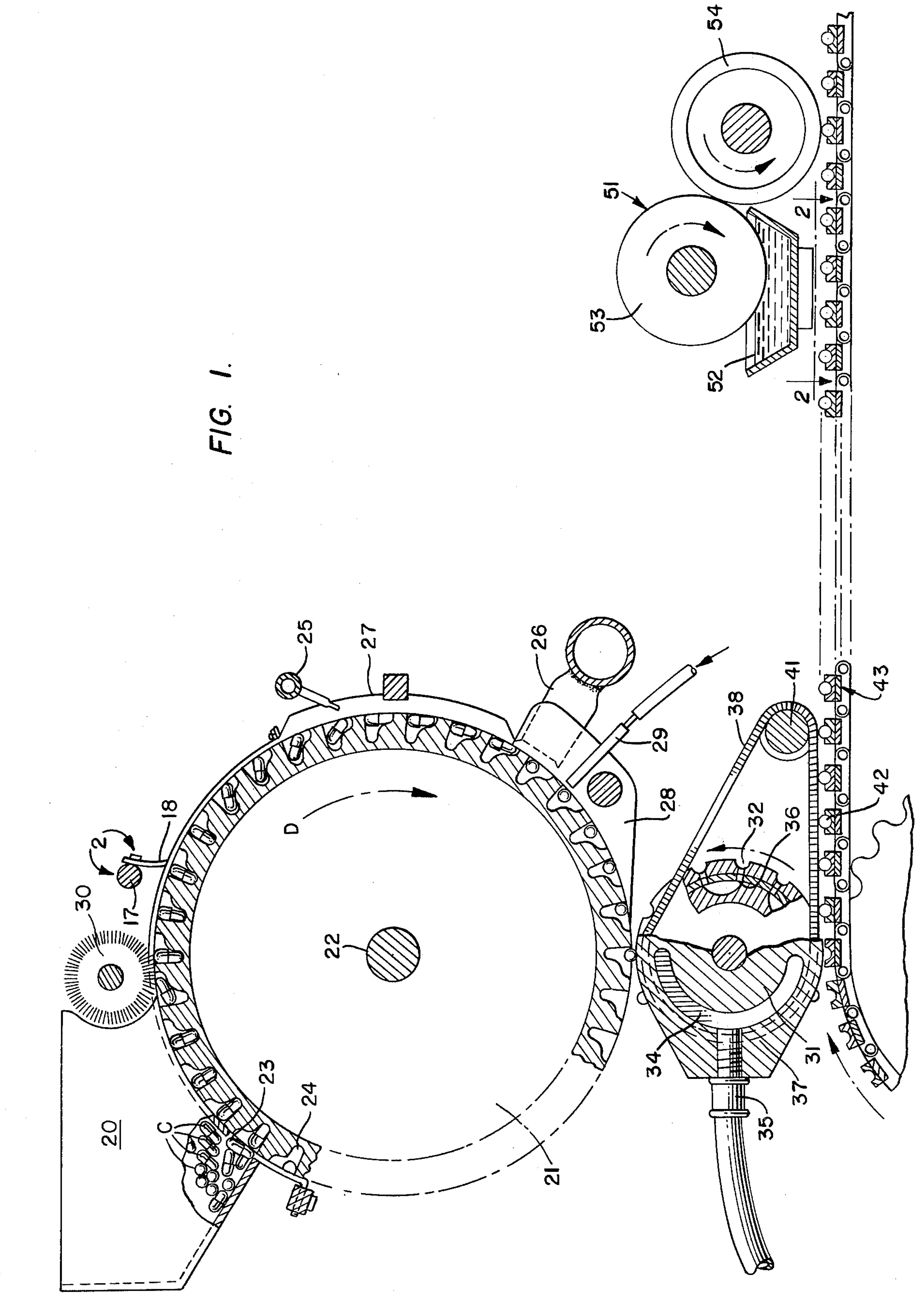
FIG. 1 is a vertical transverse sectional view taken through a capsule rectification machine employing the improved conveyor bar of the present invention.

In the specification which follows, specific terms will be used for the sake of clarity, and as descriptions of the specific forms of the invention which have been selected for illustration in the drawings. However, the use of specific terms, and the use of such specific embodiments in the drawings, is not intended to imply any limitations with respect to the scope of the invention which is defined in the claims.

It is to be noted that the improved conveyor bar of the present invention is ideally suited for use in conjunction with the capsule rectification device disclosed in U.S. Pat. No. 4,104,966 or with the rectification device disclosed in the aforementioned U.S. Pat. No. 3,871,295 (Ackley). Accordingly, details as to the rectification process itself will be omitted herein as the disclosures of both of these aforementioned patents are herewith incorporated by reference.

Turning to FIG. 1 of the drawings, the number 20 designates a capsule carrying hopper which is mounted on a suitable support (not shown), above a portion of a rotatable cylinder 21 which is mounted for rotation about an axle 22. A motor (not shown) is provided for rotating the cylinder 21. The hopper 20 has an opening as indicated at 23 for delivery of capsules to a plurality of equally spaced, generally elongated cavities 24 which are formed in and extend in rows across the outer surface of the rotatable cylinder 21. It will be observed that the capsule cavities have elongated portions which extend in a generally radial direction, allowing the capsules to be received by the cylinder 21 in generally radial positions. Some of the capsules naturally fall into the cavities 24 in an upright position, with the body portions of the capsules above the cap portions, while other capsules fall naturally into the cavities 24 in an inverted position, with the cap portions above the body portions.

Turning to the uppermost portion of the cylinder 21, the number 30 designates a rotating brush which serves to straighten out any capsules that may be lying in an angular position, as opposed to the upright position illustrated in FIG. 1. Just downstream of the brush 30 (in the direction D) is a further device, as shown within the circled arrow 2, which further serves to position the capsules in an upright position within their pockets 24.

A cross-bar 17 is provided, carrying a plurality of flexible plastic strips 18, the lower tip ends of which are free, and which are arranged to contact the surface of the cylinder 21. It will be appreciated that with either the cap portion $C_p$ in its up position, or the body portion $B_y$ in its up position, the plastic strip 18 contacts the capsules and urges them into upright positions within the pockets 24.

The number 25 designates a plurality of longitudinally directed air jets which are arranged to provide blasts of air in a direction generally along the direction D in which the rotatable cylinder 21 is rotating. The number 26 designates vacuum ducts having elongated openings, which are arranged to draw air substantially crosswise of the machine, and which effectively draw certain capsules in a crosswise direction, as appears in FIG. 1.

The number 27 designates a gaging block which serves to prevent substantial tilting movement, in the direction D, of those capsules which are arranged caps-up in their pockets 24, but to permit such movement of those capsules which are arranged bodies-up, under the influence of air from the jets 25. Gaging block 27 also assures that those capsules which have tilted to a substantially tangential arrangement will be retained in such conditions as they continue to move downwardly in the direction D.

The number 28 designates a guide block for the capsules. It is shown as carrying an air inlet 29 for secondary air, which coacts with the vacuum ducts 26 to rectify the capsules in the manner described in our aforementioned U.S. patents. Guide block 28 retains all capsules in position within their pockets, at the lower portion of the cylinder 21, as the capsules continue to move in the direction D.

Located directly beneath the cylinder 21 is a transfer cylinder 31 having a plurality of pockets 32, and an axle 33 about which the transfer cylinder 31 rotates. The pockets 32 are shaped, spaced and arranged to receive capsules transferred from the pockets of cylinder 21. This transfer is assisted by a stationary vacuum shoe 34 which, as shown, extends approximately 180° around the periphery of the transfer cylinder 31. A vacuum connection 35 is provided for the purpose of drawing a vacuum upon the capsules in the pockets 32, by way of openings 36 at the bottoms of the pockets 32. The transfer cylinder 31 is provided with a pair of grooves 37 for each of the rows of pockets on the transfer cylinder. These grooves are spaced axially from each other, and are located adjacent opposite sides of a row of pockets carried by the transfer cylinder 31. A pair of extensible flexible members, shown as chains 38, are provided for each row of pockets. A chain is positioned in each of these grooves and is stretched around an idler shaft 41. The chains 38 are positioned in a manner to pry the capsules C out of the pockets 32 at the bottom of their path of movement on the transfer cylinder 31, so that they move downwardly onto pockets 42 which are carried by conveyor 43 which is driven by sprockets or the like. The chains 38 are preferably electrically conducting, extensible chains, which can be stretched around the idler shaft 41, and which are grounded to the idler shaft 41 and/or to the transfer cylinder 31, in a manner to discharge static electricity.

The number 51 generically designates an offset printing apparatus which is ideally adapted for "spin" printing in accordance with this invention. It includes an ink reservoir 52, a transfer roll 53, and a printing roll 54 which is continuously rotated in the direction indicated by the arrow thereon, in contact with the capsules as they move underneath the roll 54, carried by their carriers 42 on the conveyor 43. In the spin printing process, one or more elongated forms of indicia are preferably printed on the outer surface of the capsule by adjusting the speed of rotation of the roll 54 so that its surface speed is considerably greater than the speed of movement of the conveyor 43. Preferably the capsule pockets 42 are composed of a slippery material such as polytetrafluoroethylene for example, which has a coefficient of friction which is less than that of the printing roll, thus permitting the capsule to rotate freely upon its axis under the frictional influence of the printing roll 54 during the spin printing process.

Figure 2:
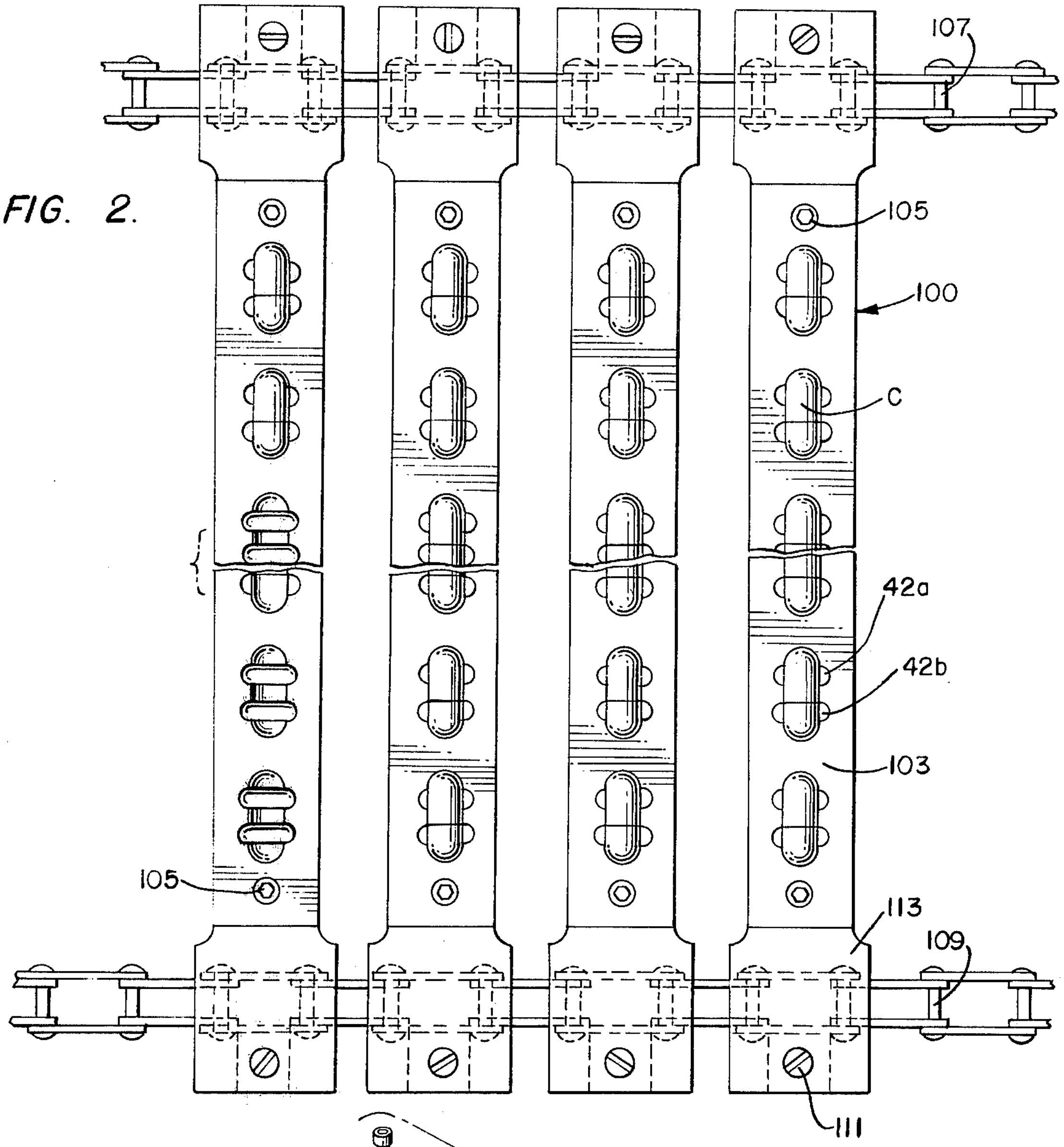
FIG. 2 is a sectional view taken along the lines and arrows 2—2 of FIG. 1 showing the conveyor bar attached to and spanning the conveyor chains.
Figure 3:
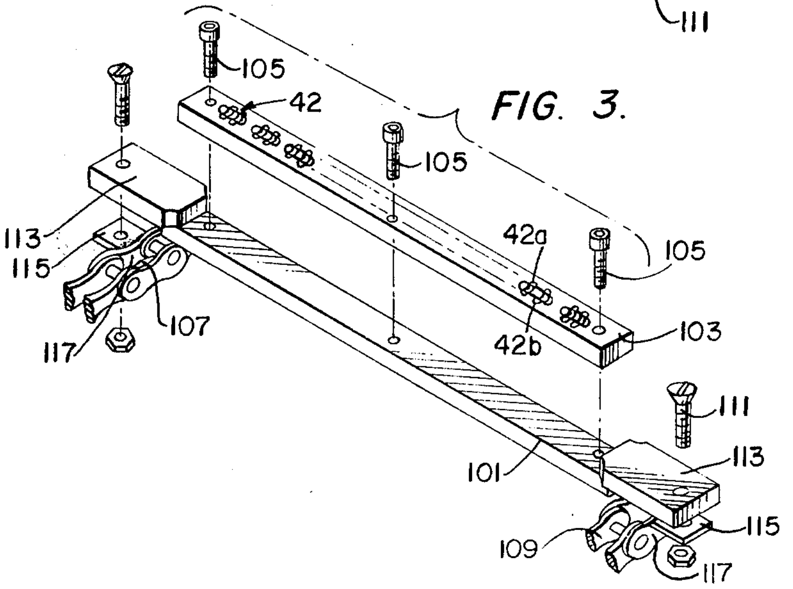
FIG. 3 is an exploded perspective view of an improved conveyor bar in accordance with the invention.

With attention now being drawn to FIGS. 2 and 3, an improved conveyor bar in accordance with the invention will be described. The conveyor bar 100 comprises an elongated bar 101 onto which an insert 103, preferably composed of polytetrafluoroethylene, is mounted by the provision of screws 105. The conveyor bar 100 spans across the conveyor chains 107, 109 and is attached thereto by the provision of a screw 111, which extends through land portion 113 of bar 101 and bracket 115 which extends perpendicularly from link members 117. The brackets 115 are preferably welded to the links 117.

A plurality of pockets 42 are formed in insert 103 by milling or other suitable procedures. The number of pockets 42 extending across insert 103 correspond to the number of rows of pockets which extend in the transport direction of cylinder 21 and transport cylinder 31.

The pockets 42 extend transversely with respect to the direction of movement of the conveyor and are provided with recessed portions **42*a*, 42*b*. The surfaces of these recessed portions do not bear against the capsules. Accordingly, as the capsules are spun about their longitudinal axes during spin printing by roll 54**, indicia imprinted on those portions which correspond to the recessed portions will not smear.

It will be readily appreciated that insert 103 can be easily detached from bar 101 and replaced by another specially formed insert when different capsule sizes are to be rectified and printed on the mechanism. Further, utilization of one piece insert 103 carrying all of the necessary pockets 42 provides a distinct advantage over prior art devices wherein separate pedestals or the like are provided to carry the capsules since dust does not easily accumulate on the continuous insert member 103.

Although this invention has been described in conjunction with certain specific forms and certain modifications thereof, it will be appreciated that a wide variety of other modifications can be made without departing from the scope and spirit of this invention as defined in the appended claims.

I claim:

1. In a capsule transporting and printing apparatus of the type having a continuously rotatable transport cylinder having a plurality of spaced apart capsule cavities arranged to receive capsules therein, means for rotating the cylinder, printing means, and an endless conveyor disposed below the transport cylinder cavities adapted to receive capsules from said transport cylinder cavities and transport said capsules to said printing means, the combination comprising: conveyor bars carried by said conveyor, an insert member releasably attached to each said conveyor bar, said insert members having a plurality of spaced apart capsule carrying pockets therein and means for changing to different size pocket insert members, each adapted to receive a capsule from said transport cylinder, said insert member pockets each including a pair of recessed portions therein located transversely with respect to each said pocket and wherein said insert member pockets are transversely disposed with respect to the transport direction of said conveyor, said insert members being disposed generally transversely with respect to the direction of conveyor movement, the spaces between adjacent pockets on said insert member being characterized by a continuous, smooth and planar surface said printing means being adapted to print upon said capsules as they are carried in said insert member pockets.

2. Apparatus as recited in claim 1 wherein said insert comprises a thermoplastic polymer.

3. Apparatus as recited in claim 2 wherein said thermoplastic polymer comprises polytetrafluoroethylene.

4. Apparatus as recited in claim 1 further including a transfer cylinder interposed between said transport cylinder and said endless conveyor, said transport cylinder comprising a plurality of spaced apart capsule receiving cavities, said transport cylinder and said transfer cylinder rotatable tangentially to each other, said transport cylinder cavities and said transfer cylinder cavities intercommunicating with one another by coming together incident to rotation of said cylinders, whereby said capsules are transferred from said transport cylinder to said transfer cylinder, said transfer cylinder and said endless conveyor tangentially rotatable with each so that said capsules may be transferred to said conveyor.

5. Apparatus as recited in claim 4 wherein said insert comprises a thermoplastic polymer.

6. Apparatus as recited in claim 5 wherein said thermoplastic polymer comprises polytetrafluoroethylene.

* * * * *